US008827461B2

(12) United States Patent
Iimura (10) Patent No.: US 8,827,461 B2
(45) Date of Patent: Sep. 9, 2014

(54) IMAGE GENERATION DEVICE, PROJECTOR, AND IMAGE GENERATION METHOD

(75) Inventor: Satoru Iimura, Gifu (JP)

(73) Assignee: Seiko Epson Corporation, Tokyo (JP)

( * ) Notice: Subject to any disclaimer, the term of this patent is extended or adjusted under 35 U.S.C. 154(b) by 448 days.

(21) Appl. No.: 13/398,892

(22) Filed: Feb. 17, 2012

(65) Prior Publication Data

US 2012/0212408 A1 Aug. 23, 2012

(30) Foreign Application Priority Data

Feb. 21, 2011 (JP) ................... 2011-034280

(51) Int. Cl.
| | | |
|---|---|---|
| *G03B 21/14* | (2006.01) | |
| *G06F 3/033* | (2013.01) | |
| *B43L 1/04* | (2006.01) | |
| *G09G 5/38* | (2006.01) | |
| *G09B 5/02* | (2006.01) | |
| *G06F 3/048* | (2013.01) | |
| *G09G 5/377* | (2006.01) | |
| *G09G 5/00* | (2006.01) | |
| *G09G 5/36* | (2006.01) | |
| *G06F 3/042* | (2006.01) | |

(52) U.S. Cl.
CPC . *B43L 1/04* (2013.01); *G03B 21/14* (2013.01); *G06F 3/033* (2013.01); *G09G 5/38* (2013.01); *G09B 5/02* (2013.01); *G06F 3/048* (2013.01); *G09G 5/377* (2013.01); *G09G 5/00* (2013.01); *G09G 5/36* (2013.01); *G06F 3/042* (2013.01)
USPC ................ 353/46; 353/121; 353/42; 345/156

(58) Field of Classification Search
USPC .............. 353/42, 51, 121, 122; 345/156, 179, 345/180, 182, 183
See application file for complete search history.

(56) References Cited

U.S. PATENT DOCUMENTS

| | | | |
|---|---|---|---|
| 7,527,383 B2 | 5/2009 | Hirata et al. | |
| 8,061,853 B2* | 11/2011 | Miyazawa et al. | ............... 353/79 |
| 2002/0075250 A1* | 6/2002 | Shigeta et al. | ............... 345/204 |
| 2007/0146646 A1* | 6/2007 | Rodriguez, Jr. | ................. 353/69 |
| 2008/0316438 A1* | 12/2008 | Midorikawa | .................... 353/70 |
| 2011/0229039 A1* | 9/2011 | Kitada | ......................... 382/187 |
| 2011/0243380 A1* | 10/2011 | Forutanpour et al. | ......... 382/103 |
| 2011/0279362 A1* | 11/2011 | Kikuchi | ........................ 345/156 |
| 2011/0279480 A1* | 11/2011 | Kikuchi | ........................ 345/660 |
| 2013/0127716 A1* | 5/2013 | Nagashima | ................... 345/158 |

FOREIGN PATENT DOCUMENTS

| | | |
|---|---|---|
| BR | PI0902422 A | 4/2011 |
| JP | 2004-046797 A | 2/2004 |
| JP | 2008-541210 A | 11/2008 |
| JP | 2011-002650 A | 1/2011 |
| WO | WO-2006-116869 A | 11/2006 |

* cited by examiner

*Primary Examiner* — William C Dowling
(74) *Attorney, Agent, or Firm* — ALG Intellectual Property, LLC (57) ABSTRACT

An image generation device includes a storage unit that stores input object data indicating content information of an input object which is input on a presentation screen, a determination unit that determines a display position located further on an upper side than an input position of the input object on the presentation screen, and an image generation unit that generates a presentation image which is an image displayed on the presentation screen and where the input object is displayed according to the display position determined by the determination unit.

20 Claims, 8 Drawing Sheets

IMAGE GENERATION DEVICE, PROJECTOR, AND IMAGE GENERATION METHOD

The entire disclosure of Japanese Patent Application No. 2011-34280, filed Feb. 21, 2011 is expressly incorporated by reference herein.

BACKGROUND

1. Technical Field

The present invention relates to an image generation device, a projector, and an image generation method.

2. Related Art

For example, in a classroom, a student writes a solution on the whiteboard using an electronic pen in a state where a problem image is displayed on the whiteboard. For example, JP-A-2011-2650 discloses that a synthesized image including a trajectory according to a position of infrared light emitted from a front end of a pointing device, imaged with a camera, is generated and projected, using a PC (Personal Computer) and a projector. In a spacious place such as a classroom, it is necessary to write characters or the like on the upper region of the whiteboard or the like such that people in the rear seats also easily view the characters.

However, for example, it is difficult for an elementary school student or a person in a wheelchair to write characters or the like on the upper region of the whiteboard or the like. In addition, a thin and long electronic pen such as a pointer may be used in order to write characters or the like on the upper region but is not convenient to use as compared with a typical electronic pen. In addition, a method in which input objects such as characters which are input on a presentation screen are manually moved also takes time.

SUMMARY

An advantage of some aspects of the invention is to solve at least a part of the problems described above, and the invention can be implemented as the following forms or application examples.

An aspect of the invention is directed to an image generation device including a storage unit that stores input object data indicating content information of an input object which is input on a presentation screen; a determination unit that determines a display position located further on an upper side than an input position of the input object on the presentation screen; and an image generation unit that generates a presentation image which is an image displayed on the presentation screen and where the input object is displayed according to the display position determined by the determination unit.

According to the aspect of the invention, the image generation device can generate an image where an input object which is input on a presentation screen is disposed at an appropriate position by generating a presentation image where the input object is displayed at a display position located further on an upper side than an input position.

According to the aspect of the invention, the image generation device can generate an image where an input object is displayed at an appropriate position corresponding to a display position of an existing object.

According to the aspect of the invention, since content of input object data can be reflected on existing object data, the image generation device can generate an image where an input object is displayed at an appropriate position even if input objects are input repeatedly.

According to the aspect of the invention, the image generation device can generate an image which is easily viewed to a user by generating an image including an input object as a new presentation image even in a case where the ratio where an existing object and the input object take up a display region of a presentation screen is large.

According to the aspect of the invention, the image generation device can generate an image where an added object is disposed at an appropriate position by determining a display position depending on an instruction or a default value.

According to the aspect of the invention, the image generation device can generate an image on which content of an input object is reflected.

Another aspect of the invention is directed to a projector including the image generation device, and a projection unit that projects the presentation image onto the presentation screen.

According to the aspect of the invention, the projector can generate and project an image where an added object is disposed at an appropriate position by determining a display position depending on an instruction or a default value.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a projector according to an embodiment of the invention will be described with reference to the drawings. In addition, the following embodiments do not limit aspects according to the invention. Not all the configurations shown in the following embodiments are essential solving means of aspects according to the invention.

First Embodiment

Figure 1:
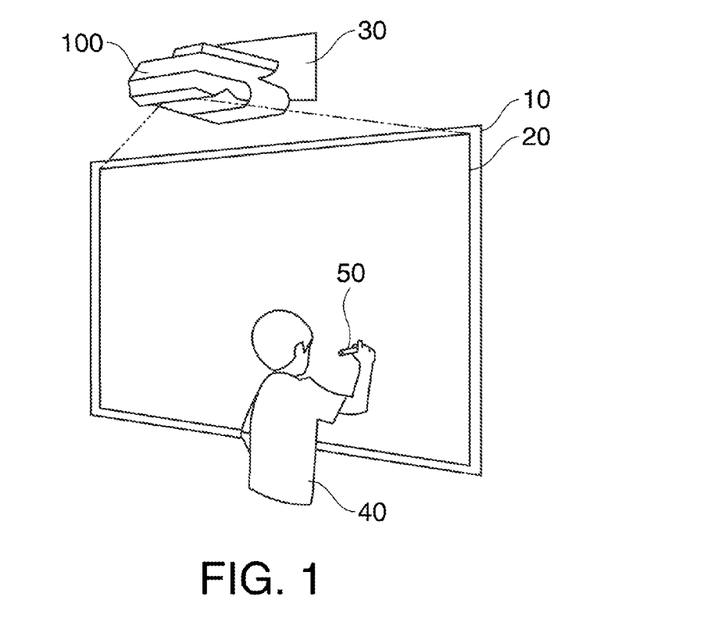
FIG. 1 is a diagram illustrating a projection situation according to a first embodiment.

FIG. 1 is a diagram illustrating a projection situation according to a first embodiment. A projector 100 is installed in the wall of the classroom with a bracket 30, and projects a presentation image 20 onto a screen (presentation screen) 10 on the wall. A student 40 who is an elementary school student writes characters using an electronic pen 50 on the projected presentation image 20.

Figure 2:
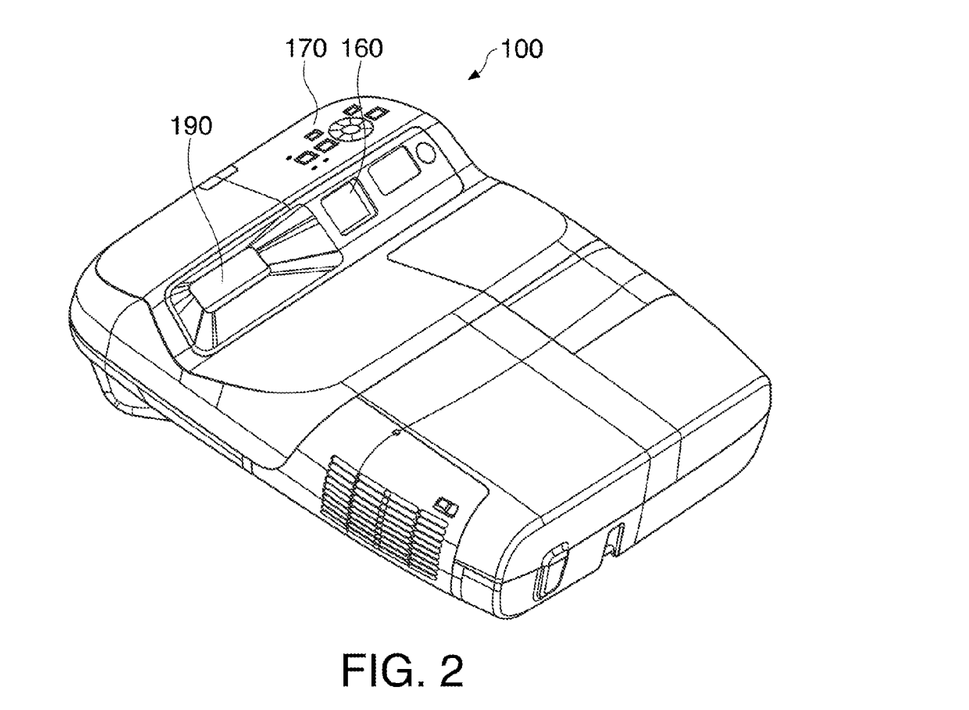
FIG. 2 is an exterior view of the projector according to the first embodiment.

FIG. 2 is an exterior view of the projector 100 according to the first embodiment. FIG. 2 shows that the projector 100 installed in FIG. 1 is upside down (a state where the bottom surface became an upper surface). The projector 100 includes a receiving unit 160 which images a region including the presentation image 20, an operation unit 170, and a projection unit 190.

Figure 3:
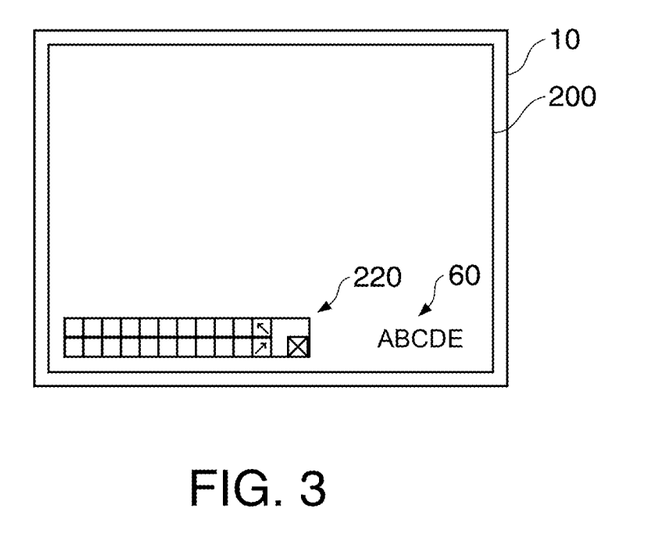
FIG. 3 is a diagram illustrating an example of the presentation image before an input is completed according to the first embodiment.

FIG. 3 is a diagram illustrating an example of the presentation image 200 before an input of the object is completed according to the first embodiment. The projector 100 obtains information regarding a display region of the presentation image 200 (the size or the coordinates of the display region) or information regarding the input object 60 from a captured image which is captured by the receiving unit 160 and indicates a region including the presentation image 200, determines a position of the input object 60 in the display region, generates the presentation image 200 including the input object 60 which is disposed at the determined position in the display region, and projects the image.

Figure 4:
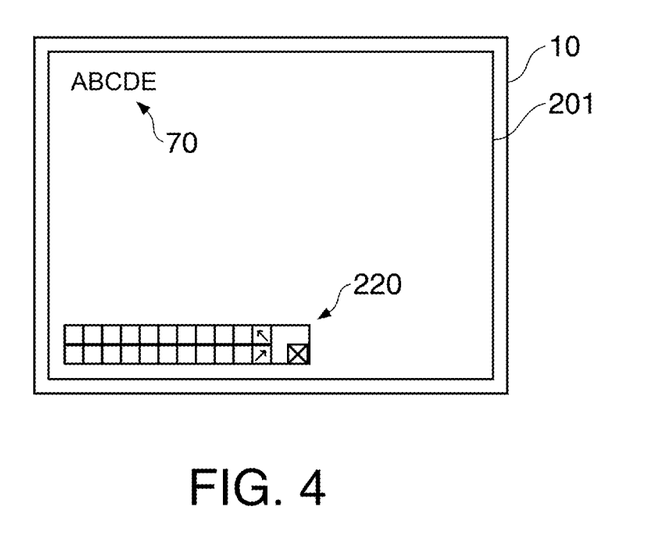
FIG. 4 is a diagram illustrating an example of the presentation image after the input is completed according to the first embodiment.

FIG. 4 is a diagram illustrating an example of the presentation image 201 after the input of the object is completed according to the first embodiment. In addition, an interactive menu image 220 is a kind of instruction image for receiving content information regarding content of the input object 60 indicating characters or the like, and is an image for selecting kinds of lines, colors, display positions, and the like of the input object 60 through a selection operation using the electronic pen 50. The projector 100 determines a display region of the existing object 70 obtained by changing the display position of the input object 60 based on the information regarding the display position obtained from the captured image which has been captured by the receiving unit 160 and the information regarding the input object 60 on the presentation image 200, through the selection operation of the display position using the electronic pen 50, and generates and projects the presentation image 201 including the existing object 70 which is disposed at the determined position in the display region.

Here, the objects labeled 70, 71, 75, 76, 77, 78, 79, 80, 81, 82, 83, are e.g. hand-written characters.

As shown in FIG. 1, the student 40 is not tall, and thus may not input characters on the upper region (for example, the region which is located further at the upper part than the center of the presentation image 20 in the vertical direction, the uppermost region when the presentation image 20 is equally divided into three in the vertical direction, or the like) of the presentation image 20. Even in this case, the projector 100 has a function of displaying the existing object 70 where the input object 60 indicating characters is moved in the upper region (for example, the top left of the presentation image 201) of the presentation image 201 depending on an instruction from the student 40 or a default value.

Figure 5:
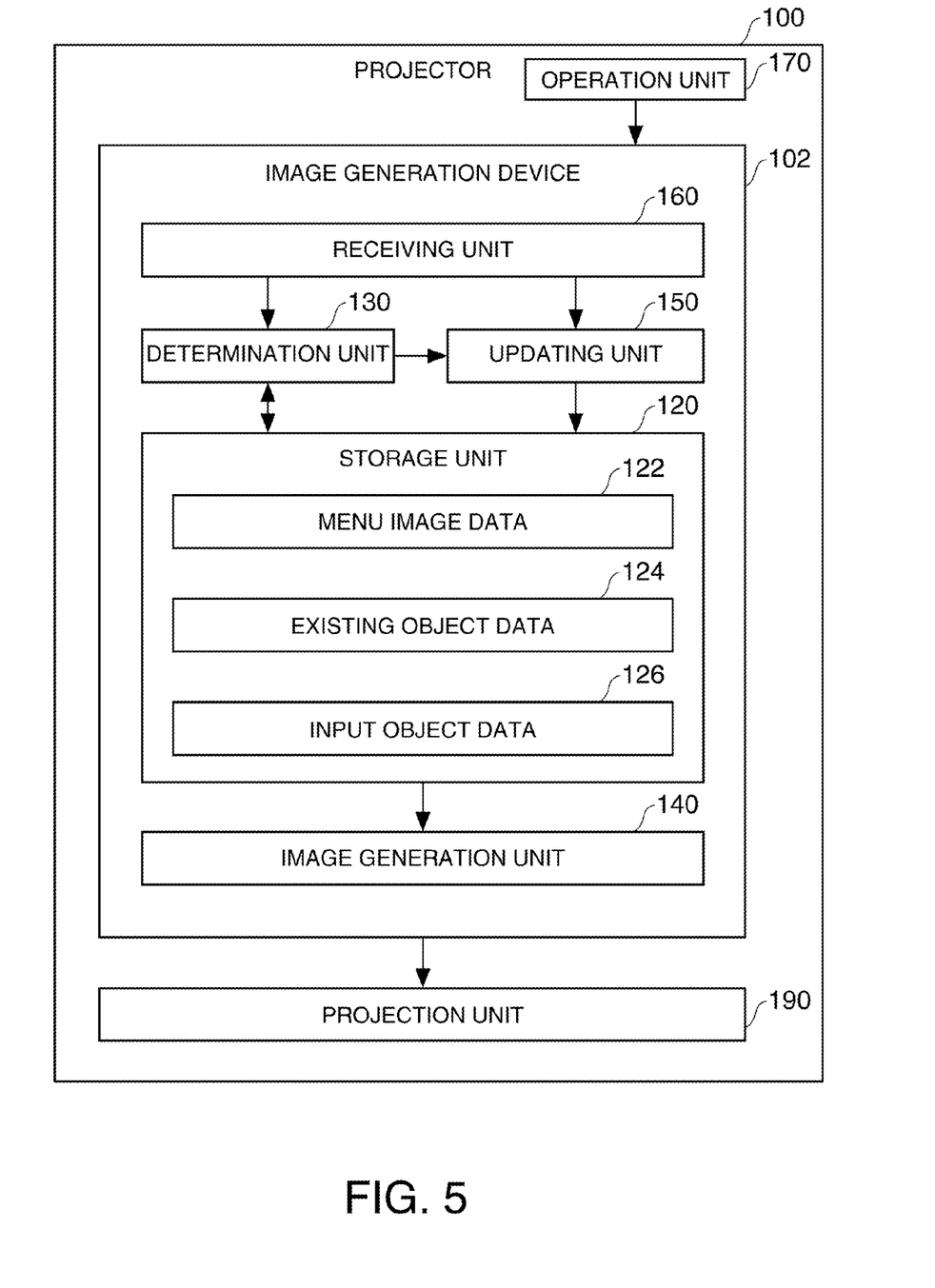
FIG. 5 is a functional block diagram of the projector according to the first embodiment.

Next, a functional block of the projector 100 having such a function will be described. FIG. 5 is a functional block diagram of the projector 100 according to the first embodiment. The projector 100 includes an operation unit 170 which receives operations from a user via operation buttons or the like, an image generation device 102 which generates the presentation image 201 and the like, and a projection unit 190 which projects the presentation image 201 or the like onto the screen 10. The image generation device 102 includes a storage unit 120, a determination unit 130 which determines a display position of an input object, an image generation unit 140 which generates the presentation image 201 including the input object according to the determination performed by the determination unit 130, an updating unit 150 which updates data in the storage unit 120, and the receiving unit 160 which receives instruction information indicating an instruction for a display position of an input object.

In addition, the storage unit 120 stores menu image data 122 for generating menu images, existing object data 124 indicating a display position and content of an object the display position of which has been determined, input object data 126 indicating content of an object a display position of which is not determined, and the like.

Figure 6:
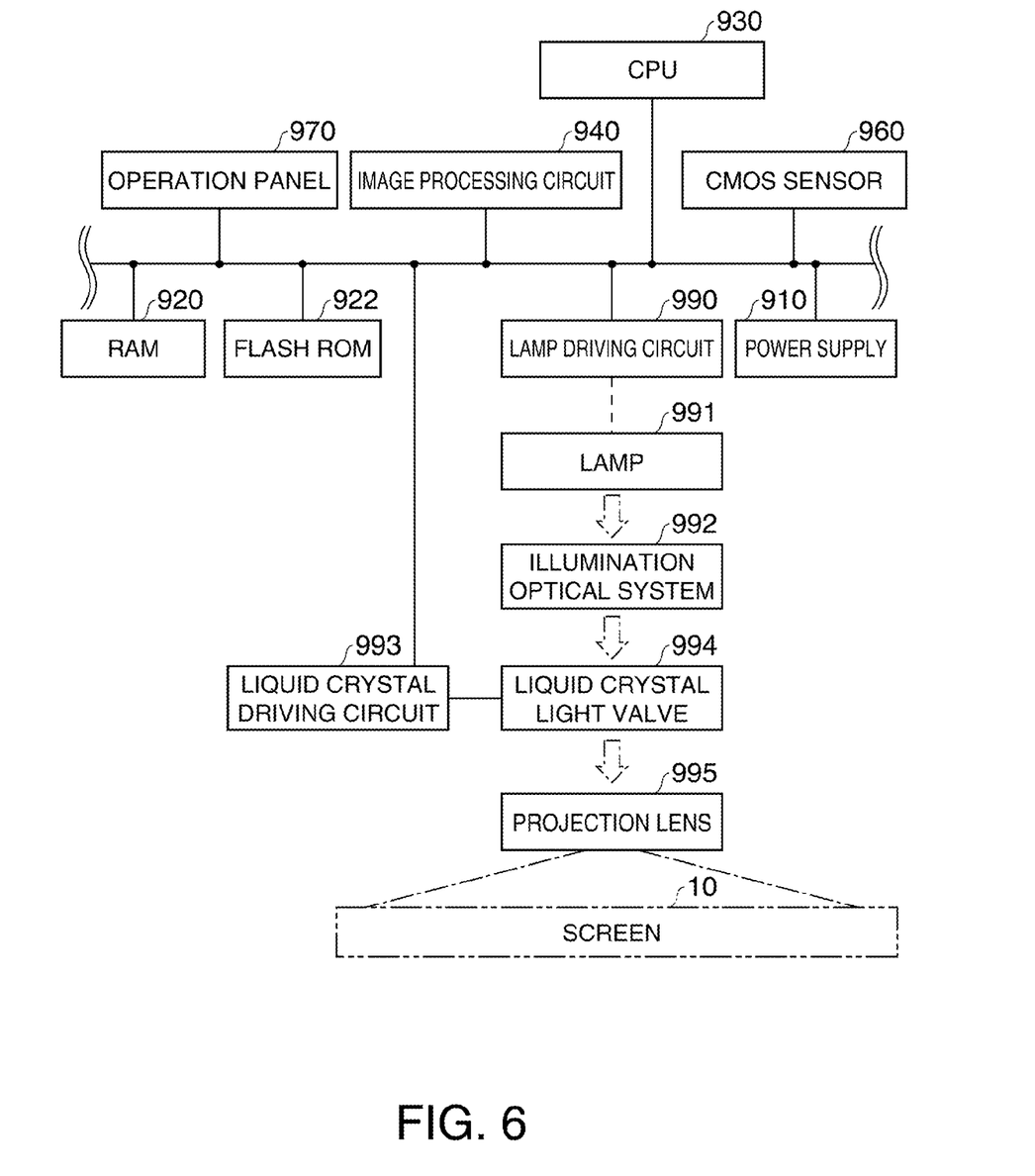
FIG. 6 is a hardware block diagram of the projector according to the first embodiment.

In addition, the projector 100 may function as the respective parts using the following hardware. FIG. 6 is a block diagram illustrating hardware of the projector 100 according to the first embodiment. For example, in the projector 100, the storage unit 120 may use a RAM 920, a flash ROM 922, and the like, the determination unit 130 and the updating unit 150 may use a CPU 930 or the like, the image generation unit 140 may use an image processing circuit 940 or the like, the receiving unit 160 may use a CMOS sensor 960 or the like, the operation unit 170 may use an operation panel 970 or the like, and the projection unit 190 may use a lamp driving circuit 990, a lamp 991, an illumination optical system 992, a liquid crystal driving circuit 993, a liquid crystal light valve 994, a projection lens 995, and the like. A power supply 910 may supply power to the respective parts.

Figure 7:
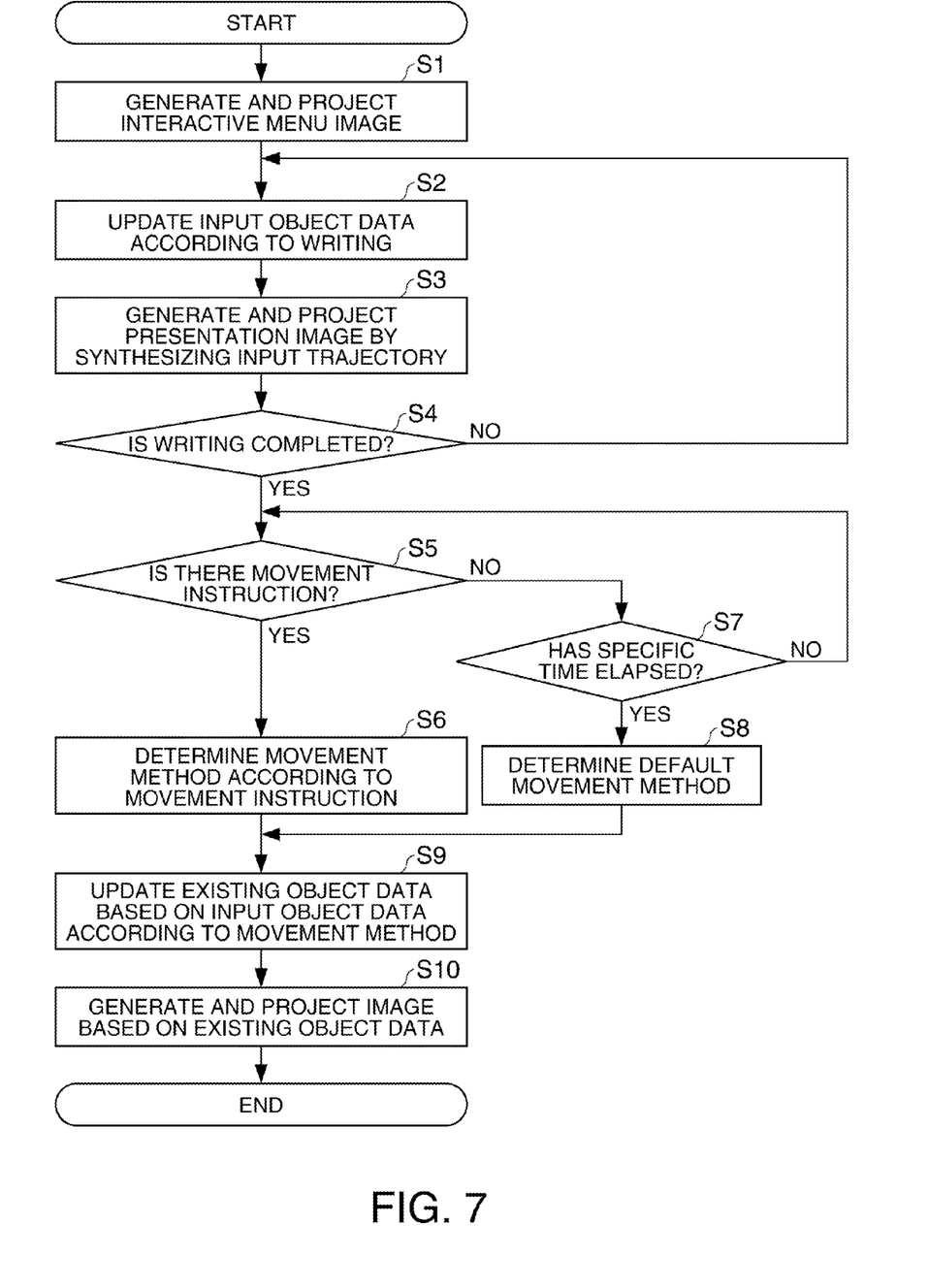
FIG. 7 is a flowchart illustrating an example of the projection procedures according to the first embodiment.

Next, projection procedures of the presentation images 200 and 201 according to the embodiment will be described. FIG. 7 is a flowchart illustrating an example of the projection procedures according to the first embodiment. For example, the student 40 presses the right click button of the electronic pen 50, and thereby instructs the interactive menu image 220 to be projected. The image generation unit 140 generates the presentation images 200 and 201 including the interactive menu image 220 in response to the projection instruction, and the projection unit 190 projects the presentation images 200 and 201 (step S1).

Figure 8:
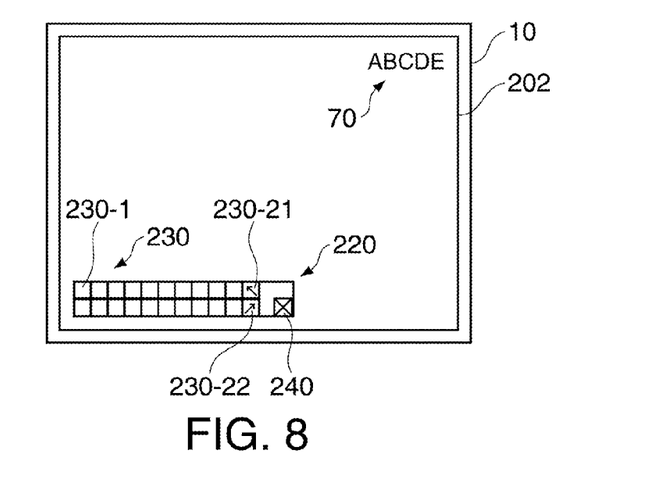
FIG. 8 is a diagram illustrating an example of an interactive menu image according to the first embodiment.

FIG. 8 is a diagram illustrating an example of the interactive menu image 220 according to the first embodiment, and a presentation image 202 is different from the presentation image 201 of FIG. 4 in terms of a display position of the existing object 70 where the input object 60 in the presentation image 201 of FIG. 3 is moved. The interactive menu image 220 included in the presentation image 202 includes a plurality of icons 230-1 to 230-22 and a close button 240. Functions such as free curve drawing, figure drawing, and paging may be allocated to the respective icons 230. In this embodiment, a function of moving an input object which is input using the electronic pen 50 to the top left is allocated to the icon 230-21, and a function of moving an input object which is input using the electronic pen 50 to the top right is allocated to the icon 230-22.

For example, the student 40 selects the icon 230 for drawing a free curve using the electronic pen 50, and draws characters or figures on the presentation images 200 to 202. More specifically, for example, the receiving unit 160 images the screen 10; the determination unit 130 detects infrared light of the front end of the electronic pen 50 included in the captured image which is captured by the receiving unit 160 and determines a position of the infrared light in the presentation images 200 to 202; and the updating unit 150 updates the input object data 126 according to the position (step S2). The image generation unit 140 generates the presentation images 200 to 202 where an input trajectory by the electronic pen 50 is synthesized with an original image based on the menu image data 122, the existing object data 124, and the input object data 126; and the projection unit 190 projects the presentation images 200 to 202 (step S3).

The determination unit 130 determines whether or not writing is completed through determination of whether or not a specific time (for example, five seconds, ten seconds, or the like) has elapsed since the infrared light of the front end of the electronic pen 50 is not detected targeting the captured image, or through determination of whether or not a writing completion operation is performed (for example, other icons 230 are selected, or the like) (step S4). If the writing is completed (step S4: YES), the flow proceeds to step S5, and if the writing is not completed (step S4: NO), the flow proceeds to subsequent input preparation step S2. The determination unit 130 determines whether or not there is a movement instruction through an instruction of the icon 230-21 or the icon 230-22 (step S5). If there is the movement instruction (step S5: YES), the flow proceeds to step S6, and if there is no movement instruction (step S5: NO), the flow proceeds to step S7. The determination unit 130 determines a movement method (for example, movement to the top left, movement to the top right, or the like) in response to the movement instruction (step S6).

In addition, the determination unit 130 determines whether or not a specific time (for example, five seconds, ten seconds, or the like) has elapsed in a state where there is no movement instruction (step S7). If a specific time has elapsed in a state where there is no movement instruction (step S7: YES), the determination unit 130 determines a default movement method (for example, movement to the top left, or the like) (step S8). On the contrary, if there is the movement instruction before the specific time has elapsed (step S7: NO), the flow proceeds to step S5.

The updating unit 150 updates the existing object data 124 based on the input object data 126 in response to the movement method determined by the determination unit 130 (step S9). For example, if the movement method is the top left, the determination unit 130 calculates the top-leftmost position which does not overlap the existing object which is present in the current presentation images 200 to 202, based on the existing object data 124 stored in the storage unit 120; and the updating unit 150 adds data regarding the input object indicating an object ID, the corresponding top-left position, a bottom-right position corresponding to the top-left position, a pixel color, a position where the pixel is present, and the like, to the existing object data 124, and deletes the data from the input object data 126.

Further, the image generation unit 140 generates the presentation images 200 to 202 based on the existing object data 124 which has been updated by the updating unit 150, and the projection unit 190 projects the presentation images 200 to 202 onto the screen 10 (step S10).

As described above, according to the embodiment, the projector 100 can generate and project the presentation images 201 and 202 which display an input object located further at the upper display position than the input position. In addition, according to the embodiment, the projector 100 can generate and project the presentation images 201 and 202 where the input object 60 which is added using the electronic pen 50 is disposed at an appropriate position by determining a display position in response to an instruction from a user or a default value. Thereby, the projector 100 can project the presentation images 201 and 202 where characters or the like are displayed in the upper region even in a case where, for example, elementary school students or the like write the characters or the like on the lower region of the presentation image 20 using the electronic pen 50 in the elementary school or the like, and thus display the characters or the like so as to be easily viewed. However, in a case where an input object is input at a higher position, for example, the upper region of the presentation image, an input position of the input object may be a display position of the existing object as it is.

Second Embodiment

Figure 9:
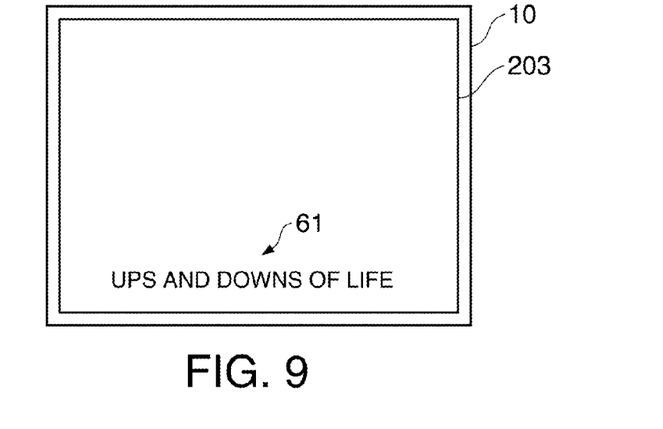
FIG. 9 is a diagram illustrating an example of the presentation image before an input is completed according to a second embodiment.
Figure 10:
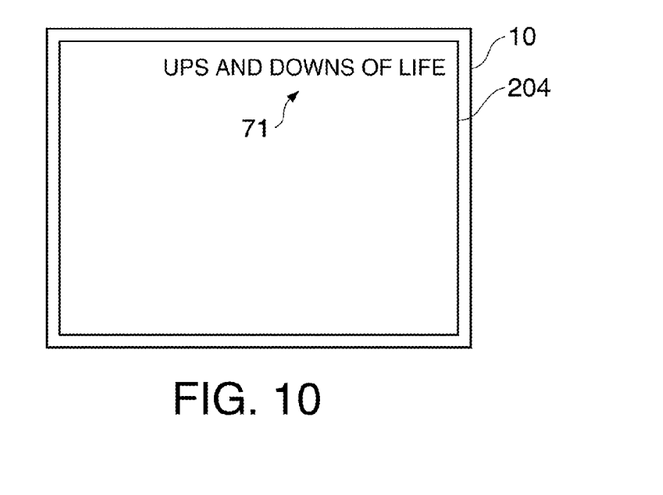
FIG. 10 is a diagram illustrating an example of the presentation image after the input is completed according to the second embodiment.

FIG. 9 is a diagram illustrating an example of the presentation image 203 before an input is completed according to a second embodiment. FIG. 10 is a diagram illustrating an example of the presentation image 204 after the input is completed according to the second embodiment.

Since the input object 60 in the first embodiment is a horizontally written character string, the input object is moved to the top left according to a default value; however, as shown in the presentation image 203, when the input object 61 is a vertically written character string, the input object may be moved to the top right as in the presentation image 204.

In addition, the determination unit 130 may determine whether an input object is vertically written or horizontally written based on coordinate information (for example, a top-left coordinate position and a bottom-right coordinate position of the rectangular shape surrounding the input objects 60 and 61) included in the input object data 126. Alternatively, the determination unit 130 may determine whether or not an input object is a character string by performing a character recognition process for the input objects 60 and 61 based on the input object data 126, and may determine whether or not an input object is vertically written or horizontally written if the input object is a character string.

According to the embodiment, the projector 100 can generate and project the presentation image 204 where the input object 61 is displayed at an appropriate position according to the shape or the content of the input object 61.

Third Embodiment

Figure 11:
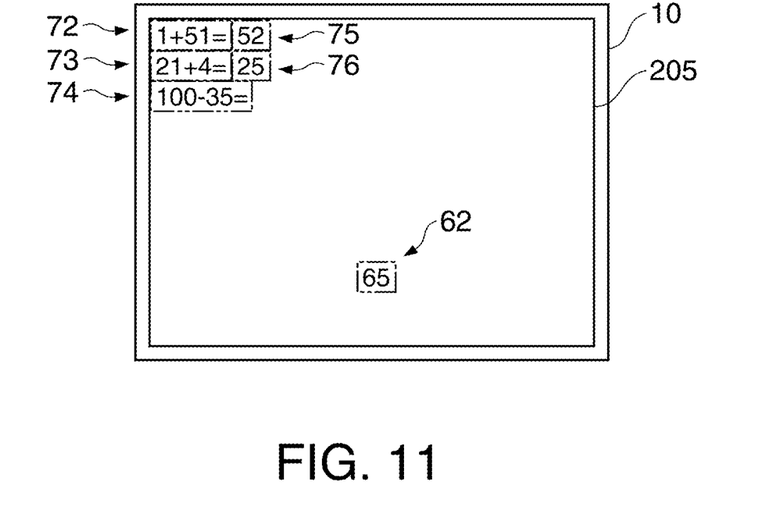
FIG. 11 is a diagram illustrating an example of the presentation image before an input is completed according to a third embodiment.
Figure 12:
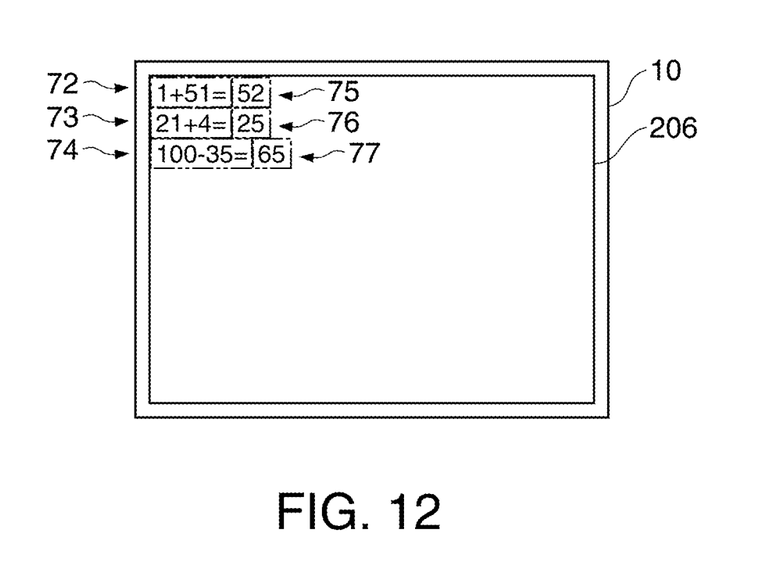
FIG. 12 is a diagram illustrating an example of the presentation image after the input is completed according to the third embodiment.

FIG. 11 is a diagram illustrating an example of the presentation image 205 before an input is completed according to a third embodiment. FIG. 12 is a diagram illustrating an example of the presentation image 206 after the input is completed according to the third embodiment. In addition, in FIGS. 11 and 12, the two-dot chain lines are shown so as to easily grasp the coordinates, and are not actually displayed.

For example, as shown in the presentation image 205, it is assumed that, in a state where existing objects 72 to 74 indicating calculation problems and existing objects 75 and 76 indicating a solution content by the student 40 are displayed, a solution (input object 62) to the existing object 74 is written by the student 40 with the electronic pen 50.

In this case, in the existing object data 124, the existing objects 72 to 74 are set as objects indicating calculation problems in advance, and the existing objects 75 and 76 are set as objects indicating solutions at the time of being generated as the input object data 126. In other words, in the state shown in FIG. 11, the existing object data 124 indicates the existing objects 72 to 74 indicating the three calculation problems and the existing objects 75 and 76 indicating two solutions. Here, in relation to the existing object data indicating that an existing object is set as a calculation problem, an object input through a character recognition process performed by the determination unit 130 is determined as being a calculation problem, and the existing object data may be updated by the updating unit 150 as existing object data indicating that the object is a calculation problem, or an input object may be determined as being an object indicating a calculation problem based on a user instruction input via the operation unit 170 from the interactive menu image 220 or the like of FIG. 8, and the existing object data may be updated by the updating unit 150 as existing object data indicating that the object is a calculation problem.

The determination unit 130 may determine that the input object 62 is a solution to the third calculation problem by referring to the existing object data 124. The determination unit 130 determines coordinates of the existing object 77 corresponding to the input object 62 such that the top-left coordinate position of the rectangular shape including the input object 62 corresponds with the top-right coordinate position of the existing object 74 based on coordinate information for the existing object 74 (the third calculation problem) included in the existing object data 124. The updating unit 150 updates the coordinate information for the existing object 77 included in the existing object data 124 according to the determination. In addition, the determination unit 130 may determine the coordinates of the existing object 77 so as not to overlap the existing object 76 in consideration of the coordinate information for the existing object 76 indicating other solutions. Further, the determination unit 130 may determine that an input object is an object indicating a solution to a calculation problem based on a user instruction input via the operation unit 170 from the interactive menu image 220 or the like of FIG. 8, or may determine a display position of an object indicating a solution based on an instruction from a user who selects a display position.

As described above, according to the embodiment, since the content of the input object data 126 can be reflected on the existing object data 124, the projector 100 can generate and project the presentation image 206 where the input object 62 is displayed at an appropriate position even in a case where the input object 62 is repeatedly input. In addition, according to the embodiment, the projector 100 can generate and project the presentation image 206 where the existing object 77 indicating a solution is displayed at an appropriate position by determining kinds of existing objects 72 to 76.

Fourth Embodiment

The determination unit 130 may determine whether or not to satisfy a condition that a ratio where an existing object and an input object take up the display region of the presentation screen is equal to or more than a threshold value based on the existing object data 124 and the input object data 126, and, if the determination unit 130 determines that the condition is satisfied, the image generation unit 140 may generate an image including the input object as a new presentation image.

Figure 13:
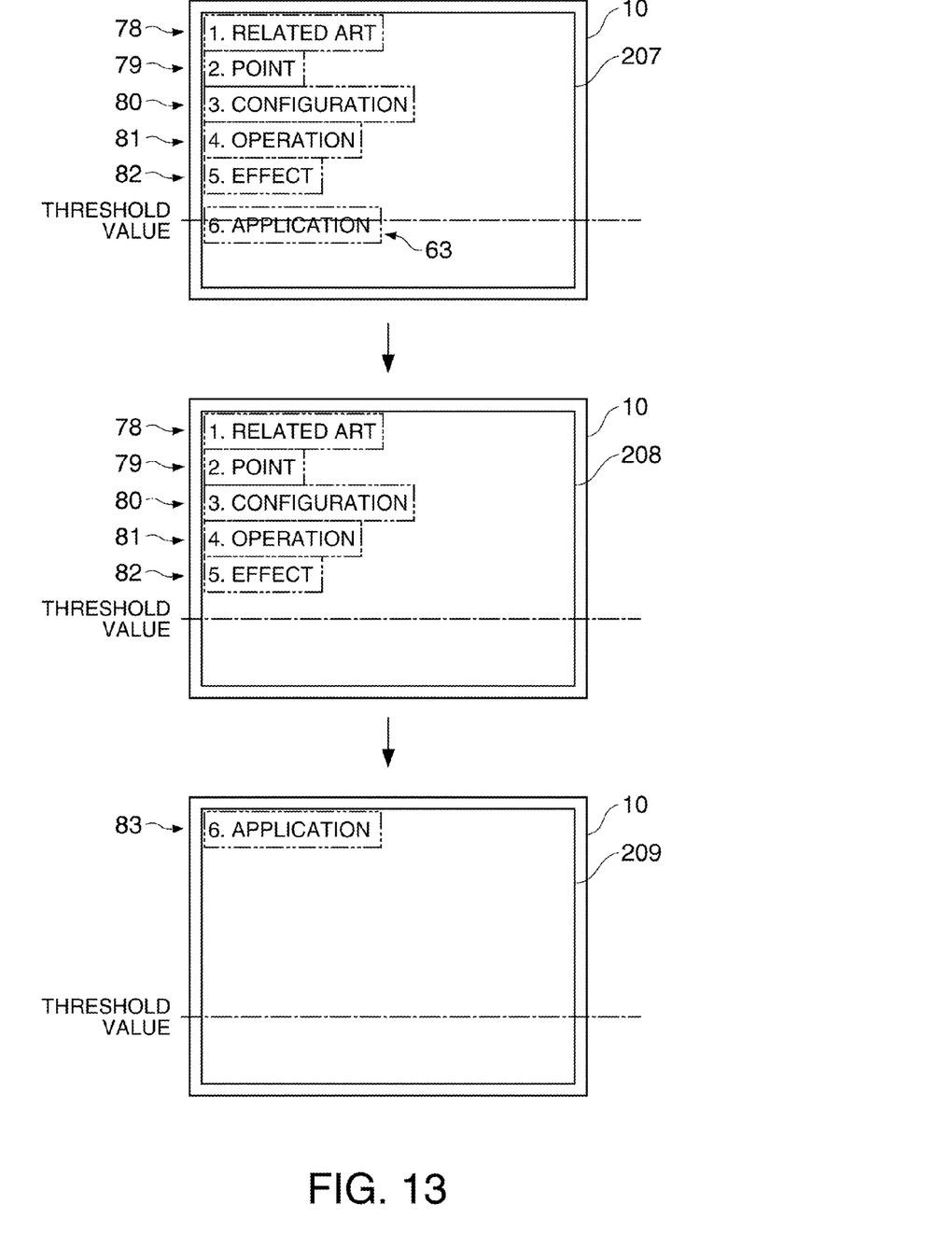
FIG. 13 is a diagram illustrating an example of the transition of the presentation image according to a fourth embodiment.

FIG. 13 is a diagram illustrating an example of the transition of the presentation images 207 to 209 according to the fourth embodiment. For example, it is assumed that, in a state where the presentation image 207 including existing objects 78 to 82 corresponding to the itemized forms 1 to 5 is displayed, the sixth input object 63 is written by the student 40 with the electronic pen 50. In addition, the one dot chain lines indicate a threshold value (here, 75% upper side of the display region in the vertical direction) and the two-dot chain lines indicate rectangular shapes in the presentation images 207 to 209 of FIG. 13; however, the lines are not actually displayed.

As shown in the presentation image 207, the threshold value or more is reached even if the input object 63 is moved to the lower side of the existing object 82. In this case, the determination unit 130 determines that the condition that a ratio where the existing objects 78 to 82 and the input object 63 take up the display region of the presentation screen is equal to or more than the threshold value is satisfied. In addition, the image generation unit 140 generates the presentation image 208 showing the existing objects 78 to 82, and then generates the new presentation image 209 including an existing object 83 corresponding to the input object 63. In addition, in this case, the updating unit 150 may store information indicating the existing objects 78 to 83 in the existing object data 124 so as to be correlated with page numbers.

As described above, according to the embodiment, even in a case where a ratio where the existing objects 78 to 82 and the input object 63 take up the display region of the presentation screen is large, the projector 100 generates an image including the input object 63 as the new presentation image 209, thereby generating an image which is easily viewed to a user.

Other Embodiments

In addition, application of the invention is not limited to the above-described embodiments and may be modified. For example, the configurations of the above-described embodiments may be combined with each other. For example, the projector 100 can project a presentation image where a solution to a problem of writing vertically written Chinese characters is disposed at an appropriate position by combining the configurations of the second and third embodiments.

In addition, although, in the above-described embodiments, the determination unit 130 detects infrared light of the front end of the electronic pen 50 included in a captured image which is captured by the receiving unit 160 and determines an input position of the input object; and the updating unit 150 updates the input object data, updates the existing object data based on the input object data according to a movement method of the input object, and determines a display position of the existing object based on the existing object data stored in the storage unit 120, there may be a configuration in which an input position of the input object is obtained from a captured image of the presentation image captured by the receiving unit 160, a display position of the existing object which has already been present is obtained from the captured image, and a display position of the existing object is determined based on the display position according to a movement method of the input object. That is to say, the storage unit 120 for storing positional information such as an input position of the input object or a display position of the existing object and the updating unit 150 for updating data in the storage unit 120 may not be necessary, and the image generation device 102 may be constituted by the determination unit 130, the image generation unit 140, and the receiving unit 160.

In addition, if an input object has a vertically long shape and is a solution to a problem of writing vertically written Chinese characters, the determination unit 130 may determine a lower position of the existing object (for example, a problem or the like) as a display position of the input object, and, if an input object has a vertically long shape and is an itemized form which is vertically written, determine a left position of the existing object (for example, an itemized form) as a display position of the input object. Further, if an input object has a horizontally long shape and is a solution to a problem of writing horizontally written Chinese characters, the determination unit 130 may determine a right position of the existing object as a display position of the input object, and, if an input object has a horizontally long shape and is an itemized form which is horizontally written, determine a lower position of the existing object as a display position of the input object. Thereby, the projector 100 can project an image where an input object is displayed at an appropriate position according to the shape of the input object and an attribute of the existing object.

Further, the receiving unit 160 is not an essential configuration. For example, if a projection screen onto which an image is projected uses a device which can directly read an input such as a touch screen, an input position of the input object is obtained without using an imaging device such as the receiving unit 160 capturing an image of the projection screen, and it is possible to determine an appropriate display position where an existing object is displayed on a presentation image.

Further, the determination unit 130 may determine a display position (for example, if there is no existing object, the display position is an uppermost position, if there is an existing object, the display position is a lower position of the existing object, or the like) located further at an upper part than an input position of the input object. In addition, although the default display position is the top left in the above-described embodiments, for example, it may be, for example, the top center, the top right, or the like. The threshold value in the fourth embodiment is not limited to 75% in the vertical direction, and may be any numerical value depending on use circumstances or the like. For example, the threshold value may be set for a sum value of areas of the respective rectangular regions of an existing object and an input object or a luminance histogram of an image.

A computer included in the projector 100 may function as the determination unit 130 or the like by reading programs stored on an information storage medium. As the information storage medium, for example, a CD-ROM, a DVD-ROM, a ROM, a RAM, an HDD, or the like may be used. In addition, an apparatus capable of having the image generation device 102 mounted thereon is not limited to the projector 100, and may be, for example, a television set, a liquid crystal monitor, a PC, a portable information terminal, or the like.

Further, an apparatus capable of having the image generation device 102 mounted thereon is not limited to the projector 100, and may be a large-sized display device or whiteboard which has a function of receiving an input from a presentation screen. In the above-described embodiments, the input object is a character string, but may be a symbol, a figure, or the like. The projector 100 can move and display an input object by determining the coordinates or a region of the input object using the above-described rectangular shape even if the input object does not form characters.

In addition, although the interactive menu image 220 is instructed to be projected by pressing the right click button of the electronic pen 50 in the above-described embodiments, there may be a configuration in which the interactive menu image 220 is instructed to be projected through an operation other than the pressing of the right click button of the electronic pen 50. For example, if a specific time has elapsed in a state where the electronic pen 50 is tightly pressed on a whiteboard or the like, the interactive menu image 220 may be instructed to be projected. Further, although the projector 100 is fixed to the wall using the bracket 30 in the above-described embodiments, the projector 100 may be placed on a platform as it is. Therefore, the projector 100 may be configured such that the interactive menu image 220 is instructed to be projected by operating the operation unit 170 of the projector 100. In this case, even a user who is poor at an operation of the electronic pen 50 can reliably make the interactive menu image 220 projected.

Further, the projector 100 is not limited to a liquid crystal projector (a transmissive type, or a reflective type such as an LCOS), and, may be a projector using, for example, a digital micro mirror device. The projection unit 190 may employ a self emission element including a solid state light source such as an organic EL element, a silicon light emitting element, a laser diode, or an LED instead of the lamp. In addition, the functions of the projector 100 may be distributed into a plurality of apparatuses (for example, a PC and a projector).

What is claimed is:

1. An image generation device comprising:
   a storage unit that stores input object data indicating content information of an input object which is input on a presentation screen;
   a determination unit that determines a display position located further on an upper side than an input position of the input object on the presentation screen; and
   an image generation unit that generates a presentation image which is an image displayed on the presentation screen and where the input object is displayed according to the display position determined by the determination unit.

2. The image generation device according to claim 1, wherein the storage unit stores existing object data indicating a display position and content information of an existing object where a display position of the input object is determined by the determination unit, and
   wherein the image generation unit generates the presentation image where the input object is displayed according to the display position of the existing object indicated by the existing object data.

3. The image generation device according to claim 2, further comprising:
   an updating unit that updates the input object data to the existing object data, the input object data regarding the input object the display position of which is determined by the determination unit.

4. The image generation device according to claim 2, wherein the determination unit determines whether or not a ratio where the existing object and the input object take up a display region of the presentation screen is equal to or more than a threshold value based on the existing object data and the input object data, and
   wherein the image generation unit generates a new presentation image including the input object if the determination unit determines that the ratio is equal to or more than the threshold value.

5. The image generation device according to claim 2, wherein, if one or more existing object displayed on the presentation image is set as an object indicating a calculation problem, the determination unit sets an input object which is input on the presentation screen as an object indicating a solution to the calculation problem and determines a display position of the input object at a position of a solution to a predetermined calculation problem.

6. The image generation device according to claim 5, wherein the determination unit determines a position of a solution to the predetermined calculation problem by referring to existing object data indicating the one or more existing object set as a calculation problem, and determines a display position of the input object.

7. The image generation device according to claim 1, further comprising:

a receiving unit that receives instruction information indicating an instruction regarding a display position of the input object,
wherein the determination unit determines a display position of the input object in response to the instruction if the instruction information is received, and, determines a display position of the input object according to a default value if the instruction information is not received.

8. The image generation device according to claim 7, wherein, if the instruction information is not received, the determination unit determines whether the input object is a vertically written character string or a horizontally written character string based on coordinate information included in the input object data indicating content information of the input object as the default value, and determines a display position of the input object according to a result of the determination.

9. The image generation device according to claim 7, wherein, if the instruction information is not received, the determination unit determines whether or not the input object is a character string by performing a character recognition process for the input object based on the input object data indicating content information of the input object as the default value, and, if the input object is a character string, determines whether or not the input object is vertically written or horizontally written, and determines a display position of the input object according to a result of the determination.

10. The image generation device according to claim 7, wherein the image generation unit generates an instruction image for receiving the content information of the input object,
wherein the receiving unit receives the content information from the instruction image, and
wherein the updating unit updates the input object data based on the content information received by the receiving unit.

11. A projector comprising:
the image generating device according to claim 1; and
a projection unit that projects the presentation image onto the presentation screen.

12. An image generation method of an image generation device, comprising:
providing input object data indicating content information of an input object which is input on a presentation screen;
determining a display position located further on an upper side than an input position of the input object on the presentation screen; and
generating a presentation image which is an image displayed on the presentation screen and where the input object is displayed according to the display position according to determining.

13. The image generation method of the image generation device according to claim 12, further comprising:
providing existing object data indicating a display position of an existing object where a display position of the input object is determined and content information of the existing object; and
generating the presentation image where the input object is displayed according to the display position of the existing object indicated by the existing object data.

14. The image generation method of the image generation device according to claim 13, further comprising:
updating the input object data to the existing object data, the input object data regarding the input object the display position of which is determined.

15. The image generation method of the image generation device according to claim 13, further comprising:
determining whether or not a ratio where the existing object and the input object take up a display region of the presentation screen is equal to or more than a threshold value based on the existing object data and the input object data; and
generating a new presentation image including the input object if it is determined that the ratio is equal to or more than the threshold value.

16. The image generation method of the image generation device according to claim 13, wherein, if one or more existing object displayed on the presentation image is set as an object indicating a calculation problem, an input object which is input on the presentation screen is set as an object indicating a solution to the calculation problem and a display position of the input object is determined at a position of a solution to a predetermined calculation problem.

17. The image generation method of the image generation device according to claim 16, wherein a position of a solution to the predetermined calculation problem is determined by referring to existing object data indicating the one or more existing object set as a calculation problem, and a display position of the input object is determined.

18. The image generation method of the image generation device according to claim 12, further comprising:
receiving instruction information indicating an instruction regarding a display position of the input object,
wherein a display position of the input object is determined in response to the instruction if the instruction information is received, and, a display position of the input object is determined according to a default value if the instruction information is not received.

19. The image generation method of the image generation device according to claim 18, wherein, if the instruction information is not received, it is determined whether the input object is a vertically written character string or a horizontally written character string based on coordinate information included in the input object data indicating content information of the input object as the default value, and a display position of the input object is determined according to a result of the determination.

20. The image generation method of the image generation device according to claim 18, wherein, if the instruction information is not received, it is determined whether or not the input object is a character string by performing a character recognition process for the input object based on the input object data indicating content information of the input object as the default value, and, if the input object is a character string, it is determined whether or not the input object is vertically written or horizontally written, and a display position of the input object is determined according to a result of the determination.

* * * * *